United States Patent [19]

Reichl

[11] Patent Number: 4,787,480

[45] Date of Patent: Nov. 29, 1988

[54] TENSIONING DEVICE FOR THE ENERGY STORE OF AN ELECTRICAL SWITCH

[75] Inventor: Erwin Reichl, Tegernheim, Fed. Rep. of Germany

[73] Assignee: Sachesenwerk, Aktiengesellschaft, Regensburg, Fed. Rep. of Germany

[21] Appl. No.: 85,025

[22] Filed: Aug. 13, 1987

[30] Foreign Application Priority Data

Aug. 13, 1986 [DE] Fed. Rep. of Germany ....... 3627508

[51] Int. Cl.[4] .......................... F03G 1/08; H01H 3/30

[52] U.S. Cl. .................................... 185/40 R; 74/122; 200/153 SC

[58] Field of Search ........................ 185/40 R; 74/122; 200/153 SC

[56] References Cited

U.S. PATENT DOCUMENTS

| | | | |
|---|---|---|---|
| 3,689,720 | 9/1972 | Patel | 200/153 SC |
| 3,773,995 | 11/1973 | Davies | 200/153 SC |
| 4,655,098 | 4/1987 | Reichl | 185/40 R |

FOREIGN PATENT DOCUMENTS

| | | | |
|---|---|---|---|
| 45546 | 2/1982 | European Pat. Off. | 200/153 SC |
| 1122133 | 1/1962 | Fed. Rep. of Germany . | |
| 0174906 | 3/1986 | Fed. Rep. of Germany . | |

OTHER PUBLICATIONS

*Oelstrhlschalter Typen HP/HPtw 5–45kV,* Publication, Sprecher & Schuh, Aug. 1980.

"Stieler Präzision", Walther Flender Firm, pp. 71–75.

Brochure No. SR 26,620, Sep. 1976, Grady of Geneva, Switzerland, "Ölarmer Leistungsschalter GUD Für Innenmontage".

"Anleitung für Die Inbetriebsetzung . . . " Chapter SR, Sheet 2661/2.

*Primary Examiner*—Allan D. Herrmann

[57] ABSTRACT

Tensioning device for the energy store of an electrical switch, the energy store including a drive spring and the switch having a turn-on lock provided with a blocking latch of the turn-on lock of the switch, the device including:

a rotatable drive shaft having a crank articulated to the drive spring, the drive shaft being rotatable into an end position at which the spring is tensioned and the drive shaft is supported at the blocking latch;

a rotatable tensioning shaft and a displacement-producing mechanism carried by the tensioning shaft;

a directional coupling device disposed on the drive shaft and coupled to the displacement-producing mechanism for rotating the drive shaft in steps in a selected direction in repsonse to rotation of the tensioning shaft;

a spring member disposed for maintaining the coupling operative engagement with the displacement-producing mechanism;

a setting member associated with the drive shaft for uncoupling the directional coupling device from the displacement-producing mechanism when the drive shaft is in its end position; and an additional energy source which is charged before the drive shaft reaches its end position and which is connected to hold the setting member in a position to maintain the directional coupling device uncoupled from the displacement-producing mechanism.

8 Claims, 4 Drawing Sheets

TENSIONING DEVICE FOR THE ENERGY STORE OF AN ELECTRICAL SWITCH

BACKGROUND OF THE INVENTION

The present invention relates to a tensioning device for the drive spring of an electrical switch, the device including a drive spring articulated to the rotating crank of a drive shaft.

Tensioning devices of this type have been known for a long time and are used to great benefit in commercially available switches such as, for example, the type VA three-pole vacuum-type circuit breaker manufactured by Sachenwerk Aktiengesellschaft, Federal Republic of Germany. The drive spring here generally stores a certain amount of energy which is sufficient for turn-on as well as for charging the turn-off spring of the power switch. A low power electric motor or a manual drive tensions the drive spring, with directional couplings, usually in the form of free-wheeling couplings, acting as step-down gears. These gears impart stepwise advances and act as a block against reversal of the tensioning movement of the drive spring.

Due to the mass inertia of the rotating parts, tensioning devices for electrical switches, when the devices are actuated by motor drives by way of directional couplings, exert an undesirable additional load on the blocking latch of the turn-on lock after the motor circuit has been interrupted. Such additional loads may also occur in manually actuated tensioning devices.

European Pat. No. 0,174,906, and its counterpart U.S. Pat. No. 4,655,098, solves the respective problem in a tensioning device operated by way of a flexible pulling means by using a free-wheeling clamping roller in which, at the end of the tensioning process, the clamping rolls are brought out of engagement with the aid of a multi-part lever arrangement disposed at the outer ring. So-called one-turn free-wheeling couplings, as disclosed, for example, at pages 71–75 of the catalog entitled "Stieler Präzision" published by the firm Walther Flender, may be used. These machine parts fulfill the requirements they are intended to meet but constitute a very expensive and space consuming solution because the multi-part lever arrangement must be provided at each free-wheeling device and because such a free-wheeling device has a significantly greater width than a simple free-wheeling device.

Brochure No. SR 26,620 dated September, 1976, by the firm Grady of Geneva, Switzerland, entitled Ölarmer Leistungsschalter GUD f/ r Innenmontage [Low-Oil Power Switch GUD for Internal Installation]discloses a drive in which a motor equipped with an eccentric and drive levers attached to the outer ring of a free-wheeling device causes a tensioning shaft to perform a stepwise rotary movement, while a second free-wheeling device supported at the drive housing serves as the reversal block. A pinion transfers the rotation of the tensioning shaft to a revolving gear at which is articulated the drive spring of the power switch as well as a bolt with which, at the end of the tensioning movement, the drive lever is brought out of engagement. The details are shown in the "Anleitung für die Inbetriebsetzung . . . " [Instructions for Start-Up Operation] for the above-mentioned power switch, Chapter SR, Sheet 2661/2. In this drive, the hand crank acts directly on the tensioning shaft, without a possibility of unlatching, and may lead to jamming of the turn-on lock.

The rotary pulse for uncoupling the drive lever is furnished in the prior art tensioning devices by the drive spring on its path between the dead center position in the tensioned state and the support in the turn-on lock. The available energy must here also overcome the force of the spring with which the drive lever is guided along the eccentric of the motor. These requirements place high demands on the setting of the drives in the testing field because, on the one hand, sufficient energy must be available to decouple the drive lever even with increasing friction due to longer periods of use and/or low ambient temperatures while, on the other hand, no sudden high energy loads are desired on the support in the turn-on lock. Self-locking must therefore be avoided in the kinematic design of the tensioning device.

SUMMARY OF THE INVENTION

It is an object of the present invention to make the decoupling between tensioning shaft and drive shaft in switches of this type independent of the effect of the drive spring.

A further object of the invention is to reduce adjustment work at the drives and to reduce sudden loads on the turn-on lock.

The above and other objects are achieved, according to the present invention, by a tensioning device for the energy store of an electrical switch, the energy store including a drive spring and the switch having a turn-on lock provided with a blocking latch of the turn-on lock of the switch, the device comprising:

a rotatable drive shaft having a crank articulated to the drive spring, the drive shaft being rotatable into an end position at which the spring is tensioned and the drive shaft is supported at the blocking latch;

a rotatable tensioning shaft and displacement-producing means carried by the tensioning shaft;

directional coupling means disposed on the drive shaft and coupled to the displacement-producing means for rotating the drive shaft in steps in a selected direction in response to rotation of the tensioning shaft;

spring means disposed for maintaining the coupling in operative engagement with the displacement-producing means;

a setting member associated with the drive shaft for uncoupling the directional coupling means from the displacement-producing means when the drive shaft is in its end position; and an additional energy source which is charged before the drive shaft reaches its end position and which is connected to hold the setting member in a position to maintain the directional coupling means uncoupled from the displacement-producing means.

The setting member may advantageously be a rotatably mounted lever which controls, by way of a cam rotating together with the drive shaft, the spring used as the additional energy source. For this purpose, the cam is provided with a step which, when the drive shaft reaches its end position, causes the lever to rotate under the action of the spring and the driver to move away from the cam drive. According to a further feature of the invention, the driver is here carried along by way of a coupling rod which acts form-lockingly on one side while a further spring disposed between the lever and driver ensures that the driver remains pressed against the cam drive during the tensioning process.

Advantageous modifications of the invention will be described below.

The invention will now be described in greater detail with reference to the drawing figures.

DESCRIPTION OF THE PREFERRED EMBODIMENTS

Figure 1:
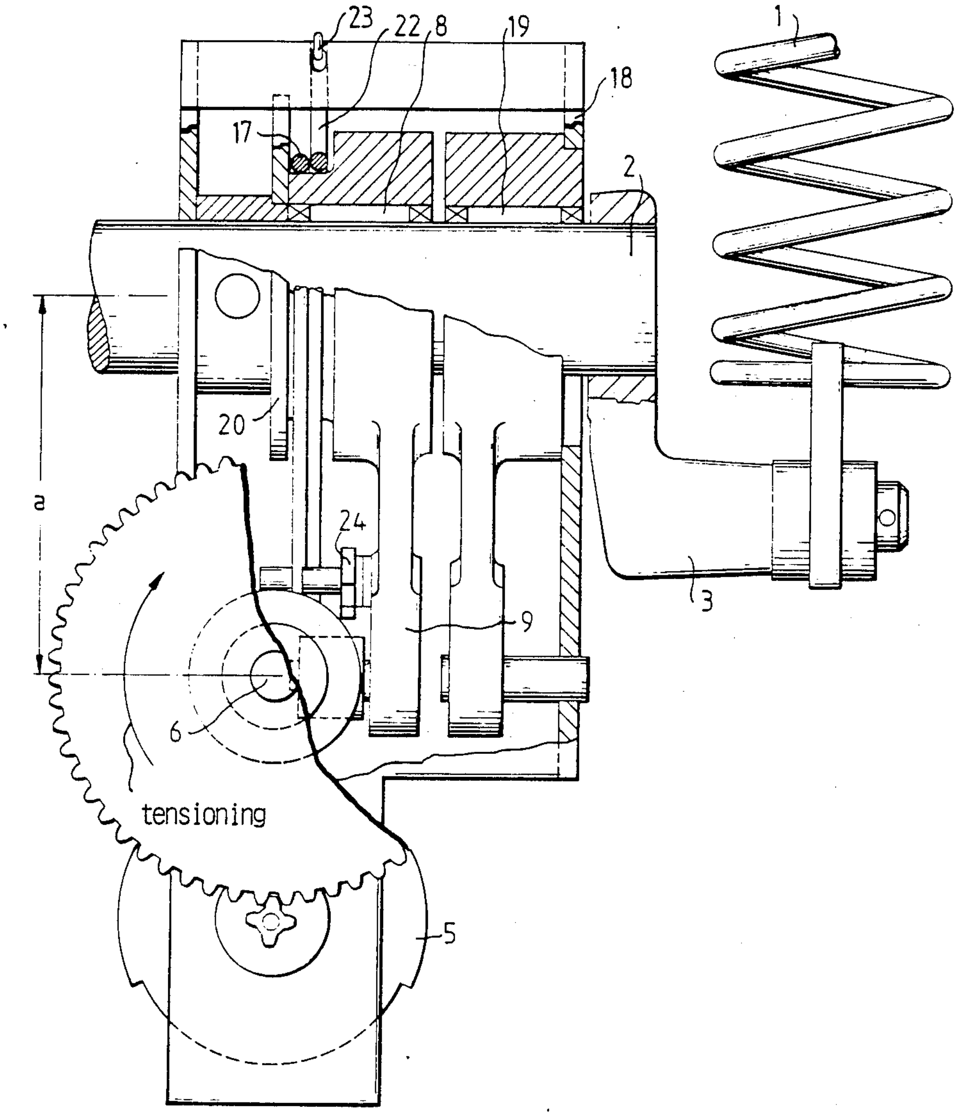
FIG. 1 is a front view, partly in cross section, of one embodiment of the tensioning device according to the present invention.

FIG. 1 shows a drive spring 1 which is connected by way of a crank 3 with a drive shaft 2. Crank 3 performs a full revolution with drive shaft 2 during each spring tensioning and turn-on process.

Figure 2:
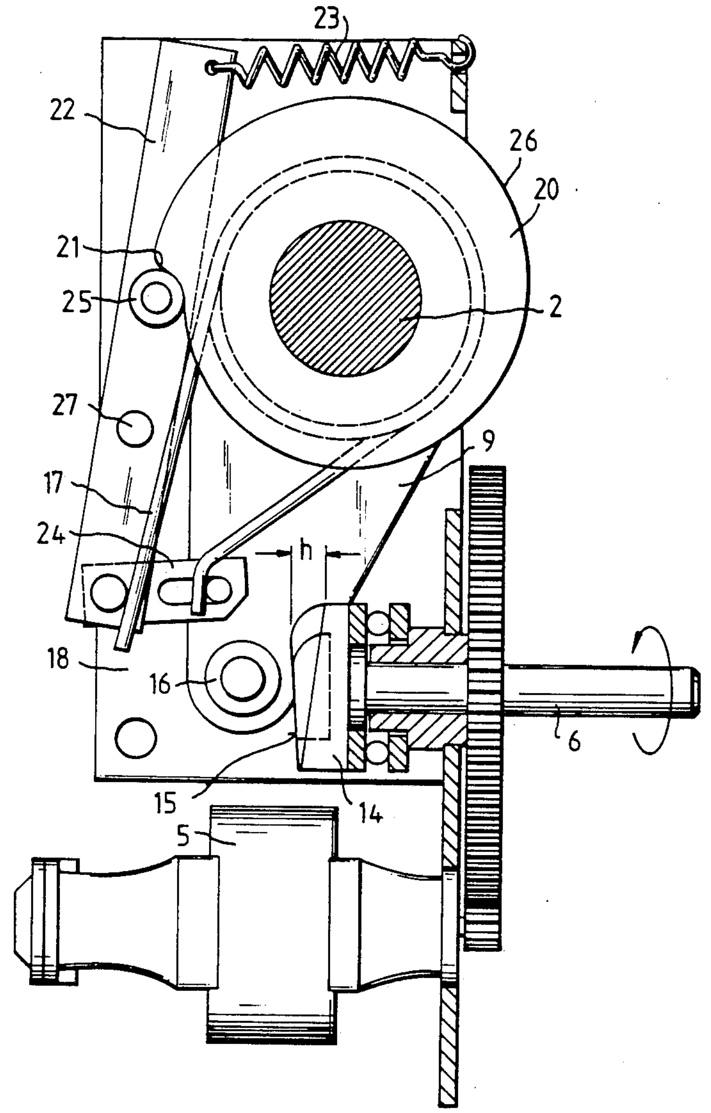
FIG. 2 is a side view, partly on section, of the device of FIG. 1.

FIG. 2 shows a cam disc 20 mounted to rotate together with drive shaft 2, a lever 22, which is a setting member, pivotal about an axis 27 and a tension spring 23 which acts as an additional energy source. A driver, or crank, 9 which actuates a directional coupling 8 (FIG. 1) designed as a free-wheeling coupling cooperates via a roller 16 with a cam drive 14. Cam drive 14 is fixed to an externally driven tensioning shaft 6 whose axis, in the illustrated embodiment, is transverse to the axis of drive shaft 2 and is spaced a distance from drive shaft 2. However, the idea of the invention can also be used with parallel or intersecting axes. Motor 5 drives tensioning shaft 6 via a wheel or tension drive while manual drive can be effected by a crank installed directly onto tensioning shaft 6.

The sequence of movements during a tensioning process is as follows:

The cam drive 14 terminating the frontal face end of tensioning shaft 6 provides a cam path 15 which can produce a displacement having an amplitude h. During the major portion of one revolution of cam drive 14, crank 9 is pivoted clockwise by one step in the tensioning direction by way of a rotationally mounted roller 16 while during the other portion of the revolution, crank 9 can move back under the force of a spring 17. A second free-wheeling device 19 (FIG. 1), whose outer ring is fixed in housing 18 of the tensioning device, prevents shaft 2 and crank 3 from rotating backwards.

After a number of the above-described tensioning steps, drive spring 1 has taken on its full energy and drive shaft 2 has reached its end position, at which shaft 2 is supported at the blocking latch of the turn-on lock of the switch.

Cam 20 seated on drive shaft 2 is provided with a step 21 into which the roller 25 of lever 22 now drops under the force of spring 23, with drive shaft 2 in the end position, and thus pulls driver 9 away from cam drive 14 by the action of a unilaterally form-lockingly acting coupling rod 24 connected between driver 9 and lever 22. In the illustrated embodiment, a spring 17 acting between lever 22 and driver 9 is a torsion spring and establishes contact between roller 16 and cam path 15 during the tensioning process, with roller 25 rolling along the generally circular path 26 of cam 20.

In FIG. 2, the tensioning device is shown in the tensioned position of drive spring 1, with driver 9 being lifted away from cam path 15.

In the subsequent turn-on process, drive shaft 2 continues to rotate clockwise. Spring 23 is again tensioned by rotation of cam 20 past lever 22 and, under the force of spring 17, driver 9 is again brought into engagement with cam drive 14. After cutting in motor 5, the next tensioning process can follow directly.

Figure 3:
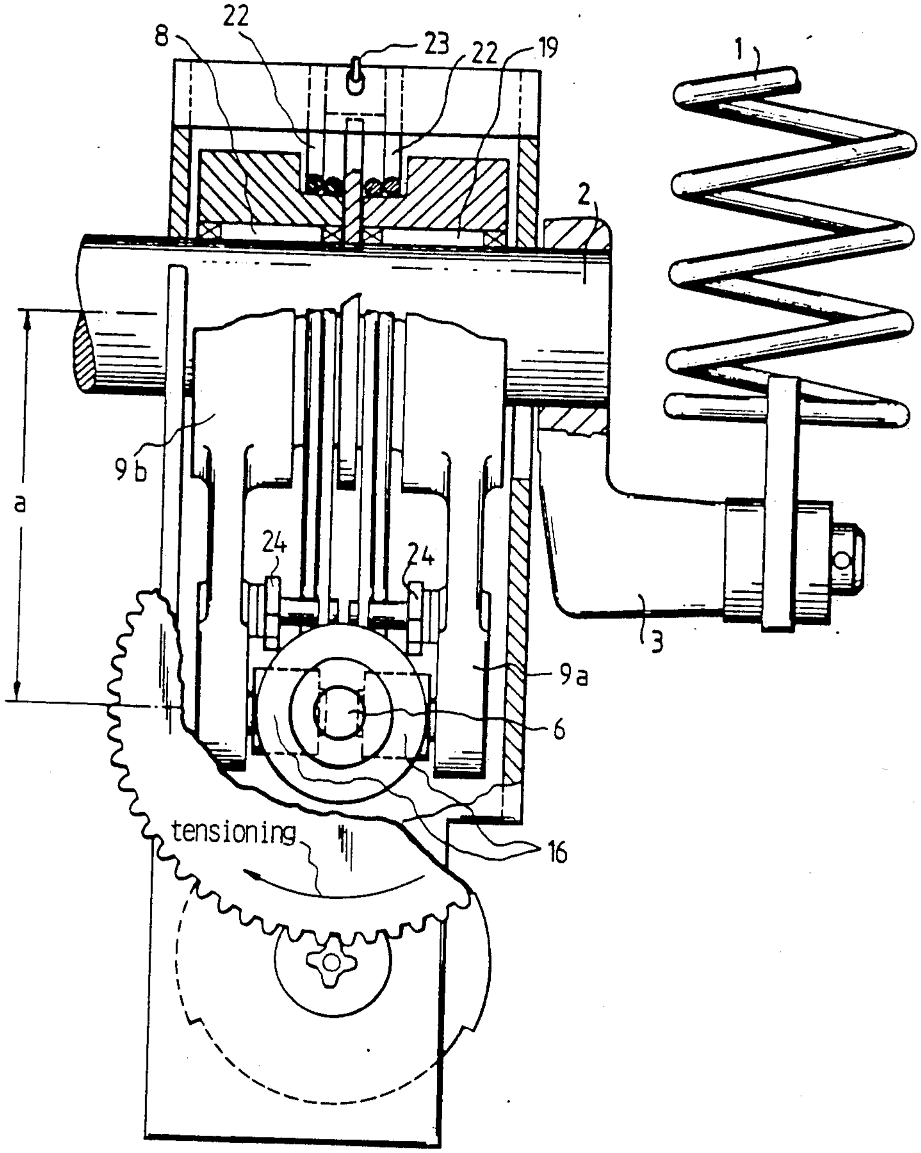
FIG. 3 is a front view, partially in section, of a tensioning device supplied with two free-wheeling devices.
Figure 4:
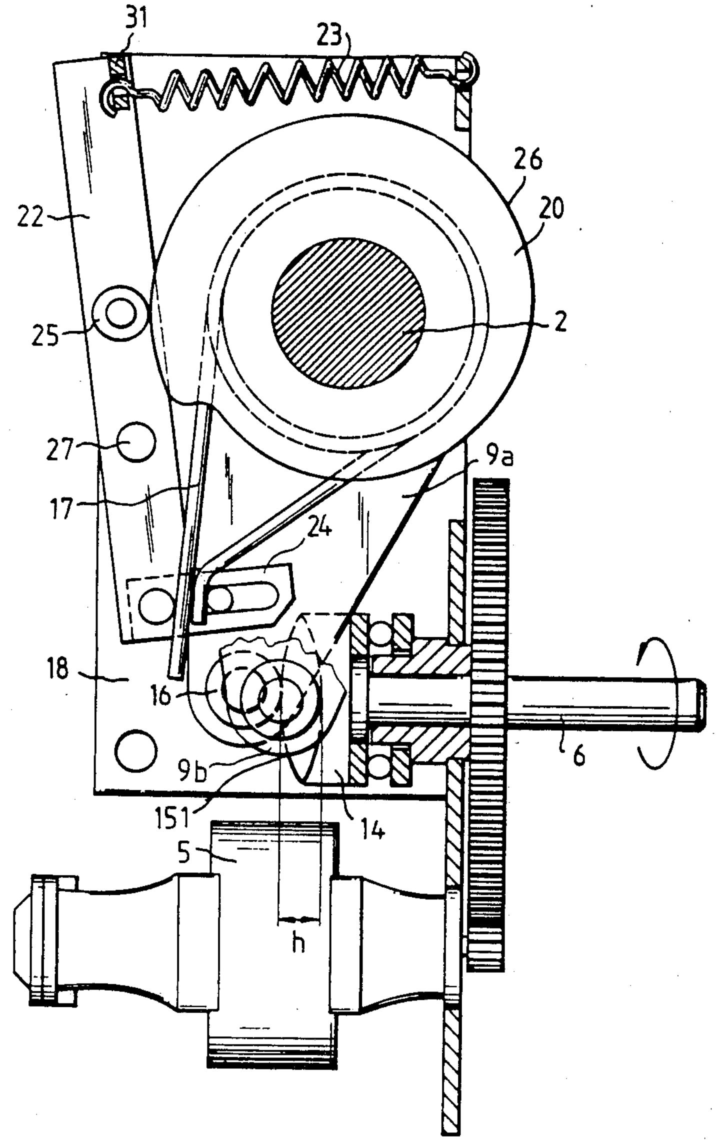
FIG. 4 is a side view, partially in section, of a tensioning device according to FIG. 3.

An advantageous embodiment of the invention in the form of a tensioning device having two driven cranks is illustrated in FIGS. 3 and 4.

The cam 151 of the cam drive 14 works together simultaneously with two cranks 9*a* and 9*b*, which carry rollers 16. For easier understanding, only that portion of the crank 9*b* that lies with the roller 16 on the cam 151 is illustrated in FIG. 4 aside from the crank 9*a*.

The cam 151 of the cam drive 14 has a continuously increasing and decreasing course, respectively, with a displacement h between highest and lowest points which are 180° apart. The coupling of the cranks 9*a* and 9*b* with the drive shaft 2 follows from FIG. 3, as previously described, with free-wheeling devices 8 and 19, respectively. The two cranks 9*a* and 9*b* are each connected via a respective coupling rod 24 and pivotable lever 22 to a bridge 31 which is connected to both levers 22 and to a spring 23, which acts as a common additional storage and which takes both cranks 9 away from contact with the cam drive 14 after drive spring 1 has taken on its full energy. During the tensioning, shaft 2 is rotated first during a rotation of 180° of the tensioning shaft 6 via the crank 9*a* and during another 180° via the crank 9*b*, which results in a continuous rotational movement of the drive shaft 2 and the continuous tensioning of the drive spring 1. In this basically already known embodiment of gears no additional crank is needed to prevent a return of the driving shaft 2 during the tensioning movement, as in FIG. 1. The crank 9*a* in FIG. 4 has just ended the tensioning movement and has reached the highest point of cam 151 while the crank 9*b* is at the lowest point and will begin producing a tensioning movement during a further rotation of tensioning shaft 6. All other functions are the same as in the embodiment according to FIGS. 1 and 2.

The invention now being fully described it will be apparent to one of ordinary skill in the art that many changes and modifications can be made thereto without departing from the spirit or scope of the invention as set forth herein.

The present disclosure relates to the subject matter disclosed in German Application No. P 36 27 508.5 and G 86 21 755.0, both of Aug. 13th, 1986, the entire specifications of which are incorporated herein by reference.

What is claimed:

1. A tensioning device comprising:

a rotatable drive shaft having a crank articulated to the drive spring, said drive shaft being rotatable into an end position at which the spring is tensioned;

a rotatable tensioning shaft and displacement-producing means carried by said tensioning shaft;

directional coupling means disposed on said drive shaft and coupled to said displacement-producing means for rotating said drive shaft in steps in a selected direction in response to rotation of said tensioning shaft;

spring means disposed for maintaining said coupling in operative engagement with said displacement-producing means;

a setting member associated with said drive shaft for uncoupling said directional coupling means from said displacement-producing means when said drive shaft is in its end position; and an additional energy source which is charged before said drive shaft reaches its end position and which is connected to hold said setting member in a position to maintain said directional coupling means uncoupled from said displacement producing means.

2. Tensioning device as defined in claim 1 wherein said additional energy source is charged by energy derived from the drive spring.

3. Tensioning device as defined in claim 2 further comprising a housing supporting said drive shaft and wherein said setting member comprises a lever pivotally mounted to said housing and said additional energy source comprises a further spring connected between said housing and said lever.

4. Tensioning device as defined in claim 3 wherein said setting member further comprises a roller rotatably attached to said lever and means coupled for rotating said roller in response to rotation of said drive shaft to cause said lever to charge said further spring during rotation of said drive shaft to the end position and for causing the energy stored in said further spring to act on said lever in a manner to cause said lever to uncouple said directional coupling means from said displacement-producing means when said drive shaft reaches its end position.

5. Tensioning device as defined in claim 4 wherein said setting member further comprises a coupling rod connected between said lever and said directional coupling means for uncoupling said directional coupling means from said displacement producing means when said drive shaft is in the end position, and spring means interposed between said lever and said directional coupling means for urging said directional coupling means into a position in which it is coupled to said displacement-producing means.

6. Tensioning device as defined in claim 1 comprising a plurality of directional coupling means, and wherein said additional energy source is operative to uncouple all directional coupling means from said displacement-producing means.

7. Tensioning device as defined in claim 1 wherein said directional coupling means comprise: a free-wheeling device having an outer ring coupling said directional coupling means to said displacement-producing means.

8. Tensioning device as defined in claim 1 further comprising a housing supporting said drive shaft and wherein said setting member comprises a lever pivotally mounted to said housing and said additional energy source comprises a further spring connected between said housing and said lever.

* * * * *